S. A. SENA.
WINDSHIELD.
APPLICATION FILED JAN. 26, 1920.

1,419,414.

Patented June 13, 1922.
2 SHEETS—SHEET 1.

Inventor
Salvator A. Sena
By J. E. Thomas
Attorney

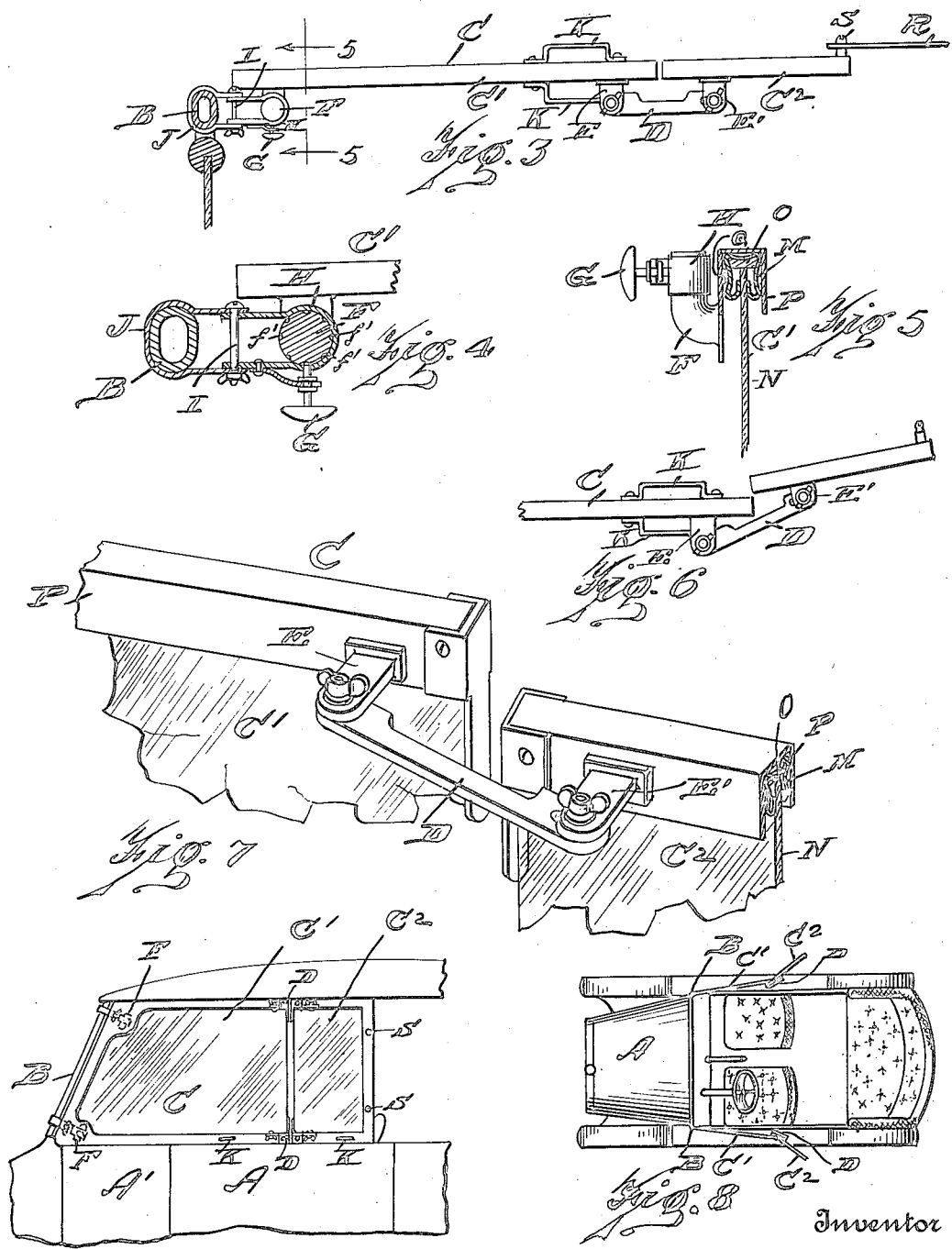

UNITED STATES PATENT OFFICE.

SALVATORE A. SENA, OF DETROIT, MICHIGAN.

WINDSHIELD.

1,419,414.  Specification of Letters Patent.  Patented June 13, 1922.

Application filed January 26, 1920. Serial No. 353,966.

*To all whom it may concern:*

Be it known that I, SALVATORE A. SENA, citizen of the United States, residing at Detroit, county of Wayne, State of Michigan, have invented a certain new and useful Improvement in Windshields, and declare the following to be a full, clear, and exact description of the same, such as will enable others skilled in the art to which it pertains to make and use the same, reference being had to the accompanying drawings, which form a part of this specification.

My invention relates to windshields for motor driven vehicles, and especially vehicles of the "touring" car type, as shown in the accompanying drawings, and more particularly described in the following specification and claims:

One of the objects of the present invention is to provide a construction embodying a pair of divided windows hinged together and to each of the supporting members of the windshield frame, the arrangement being such that the driver of the vehicle is protected from side draughts or inclement weather and is afforded a clear and unobstructed view of the road from each side of the vehicle.

Another object of the invention is to provide a large measure of protection to the occupants of the rear seat of the vehicle even though the usual "side" curtains are not employed;—the arrangement being such however that the side curtains may be secured to the frame of the auxiliary or adjustable rear extension of the sash frames if desired.

A further object is to provide for the adjustment of the respective parts of the side windows with reference to each other in order that ventilation may be afforded to the occupants of the car while protecting them against the entry of draughts, snow or rain.

A further object of the invention is to provide for swinging the window frames upon opening the side doors to admit or discharge passengers.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification—

Figure 3 is a plan view with parts in section taken on about line 3—3 of Figure 2.

Figure 4 is a sectional view through one of the windshield supporting members and the supporting bracket of the side windows, taken on or about line 4—4 of Figure 2.

Figure 5 is a detail view of the side window supporting bracket with the window frame in section, taken on or about line 5—5 of Figure 3.

Figure 6 is a plan view of a fragment of one of the side windows and its auxiliary extension, showing the hinged connection between the frames.

Figure 7 is a perspective view of a fragment of the side window and its rear extension showing the hinged link connecting the frames.

Figure 8 is a fragmentary side elevation of a motor driven vehicle in which the side windows are attached to the supporting member of an "inclined" windshield.

Figure 9 is a plan view of a motor driven vehicle showing the auxiliary extension of the side windows adjusted so as to deflect the air in order that the passengers occupying the rear seats of the vehicle may be protected from draughts.

Figure 1:
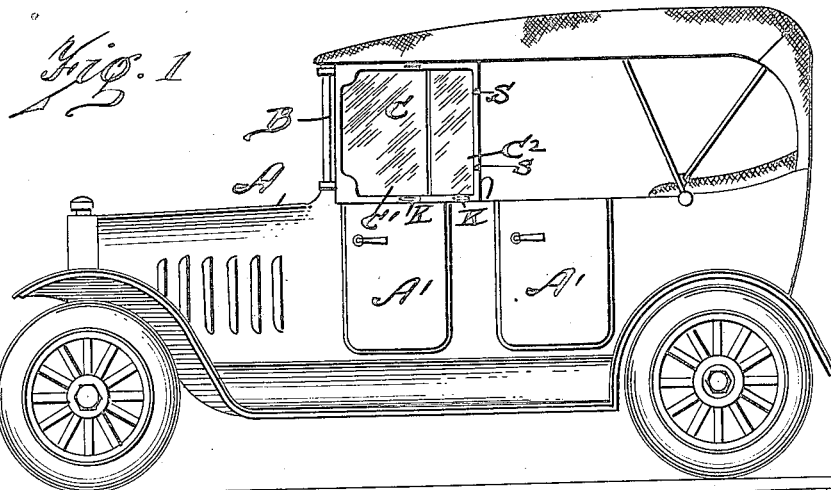
Figure 1 is a side elevation of a motor driven vehicle with the divided side windows in position.
Figure 2:
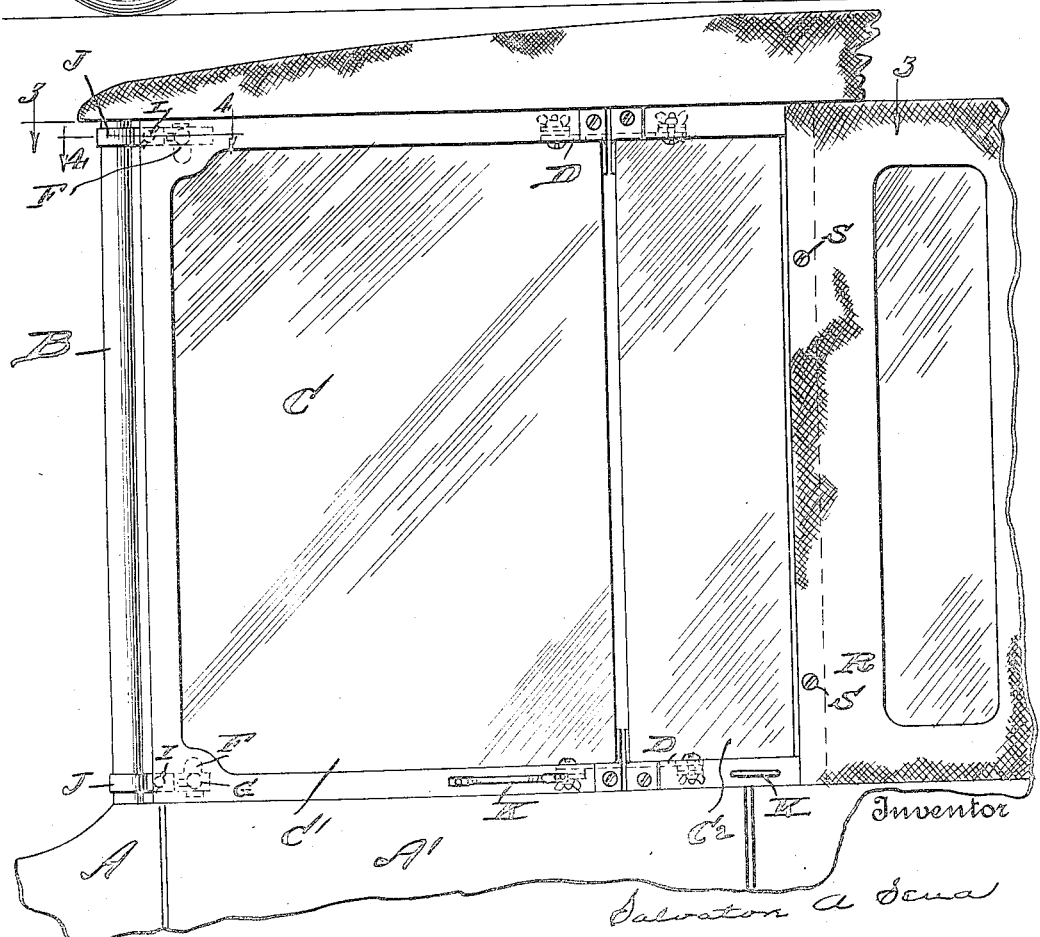
Figure 2 is an enlarged side elevation of the windows attached to one of the supporting members of the windshield frame,—showing also a fragment of the vehicle body.

Referring now to the letters of reference placed upon the drawings:—

A, denotes a motor driven vehicle and A' the doors of the vehicle. B, B are the supporting standards of the usual transverse windshield frame. C, C are main side windows, extending rearwardly from the supporting standards B, B of the windshield proper adapted to swing outwardly that passengers may enter or leave the vehicle through the doors A'.

The side windows comprise a main or forwardly disposed window frame C', and a rearwardly extending auxiliary window frame C², hinged together by an adjustable slotted link D, pivoted to a pair of lugs E, E' respectively carried by the window frames C' and C², by suitable bolts carrying winged nuts E E, whereby the windows may be secured in their adjusted positions.

F, indicates a bracket projecting from the window frame C' having a plurality of recesses f' in its periphery to receive a spring actuated detent G supported in a clip or fitting H, in turn supported by a transverse bolt I, engaging a clip or fitting J embracing the wall of the supporting standard B.

K, are handles secured to the frames of the windows to facilitate the opening or adjustment of the same. The "lights" or glass, of the side windows are supported by a resilient channel member M, adapted to impinge upon the glass N. O, indicates a felt strip lodged in the channel member M to relieve the glass of the jar incident to travelling over rough roads. The resilient channel member M is lodged in the channel member P, comprising the sash frame proper, and is held in position by a plurality of resilient clips Q, or other suitable engaging devices, carried by the channel P and extending into the concave side wall of the channel member M.

R, denotes the usual side curtains of a touring car, and S, denotes suitable fastening devices for securing the curtain to the frame C², of the auxiliary window.

Having now indicated the several parts by reference letters the construction and operation of the device will be readily understood.

When it is desired to close the sides of the vehicle as closely as may be, the auxiliary window C², is adjusted so as to be in the same plane as the window C', as indicated in Figure 3,—the side curtains being attached to the sash of the auxiliary frame by suitable fastening devices as before explained.

When however, it is desired to provide a certain amount of ventilation the auxiliary window frame may be adjusted as shown in Figures 6 and 7, thereby allowing for the circulation of air through the opening between the sections of the window.

If the side curtains are to be dispensed with,—the occupants of the rear seats may be protected from strong wind currents or draughts by adjusting the auxiliary windows as shown in Figure 8, the inclination of the windows serving to deflect the air away from the passengers as will be readily understood.

When the windows are swung open together with the doors of the vehicle to admit or discharge passengers, the spring actuated detent G, will serve to hold the window in its adjusted position until manually returned to its initial position.

Having thus described my invention what I claim is:—

1. The combination with a windshield and its supporting standards, of a fitting secured to each of said standards, clips secured to each of said fittings, a spring actuated detent carried by said clips adapted to yieldingly engage a hinge bracket or pintle, a pair of sash frames respectively provided with hinge brackets or pintles, adapted to be embraced by said clips, and provided with a plurality of recesses to receive the end of the spring actuated detents, whereby the sash frames may be yieldingly secured in their respectively adjusted positions. a pair of auxiliary sash frames hinged to the first named sash frames, and means for securing the last named frames when adjusted.

2. The combination with a windshield and its supporting standards, of a pair of sash frames respectively hinged to the said standards, means for yieldingly securing the sash frames when adjusted, a pair of auxiliary sash frames, hinge-links connecting the auxiliary sash frames with said first named sash frames, whereby the auxiliary frames may be shifted bodily and spaced from the first named frames on either side thereof to admit of the circulation of air between the rear of the first mentioned frames and the front of the auxiliary frames for purposes of ventilation, means of securing said frames when adjusted and means for regulating the space between the adjacent edges of the main and auxiliary frames.

3. The combination of a windshield, a pair of sash frames connected to the windshield, a pair of auxiliary sash frames, a lug extending from each of the first mentioned sash frames, a lug extending from each to the auxiliary frames, means adjustably connecting the lugs of the auxiliary frames with the lugs of the first mentioned sash frames whereby the auxiliary sash frames may be shifted horizontally and laterally and supported in and out of alinement with and on either side of the first mentioned sash frames.

4. In combination with a windshield, a main sash frame rotatably connected thereto, an auxiliary sash slidably connected to the main sash and spaced therefrom horizontally to permit diminished or increased ventilation between the edges thereof as the sashes are advanced toward or retracted from each other, means for adjusting the said sashes independently of each other and means for locking the same in adjusted position so that the sashes may be adjusted as a unit.

In testimony whereof, I sign this specification in the presence of two witnesses.

SALVATORE A. SENA.

Witnesses:
S. E. THOMAS,
GEORGE H. LOVEQUEST.